Nov. 25, 1924.
J. ROOK
1,516,689
CASE FOR STERILIZING OR CARRYING CLINICAL THERMOMETERS
Filed March 9, 1923
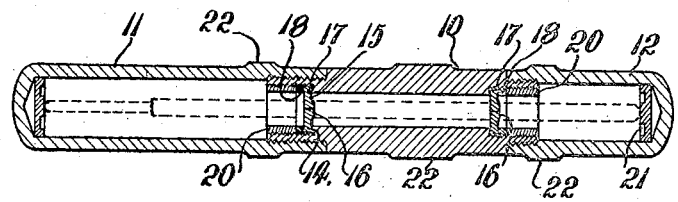
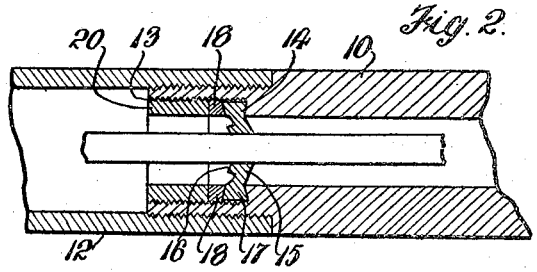
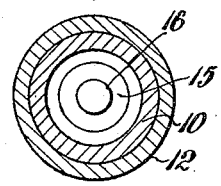
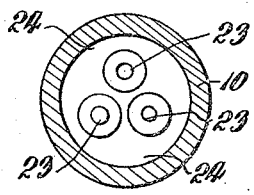
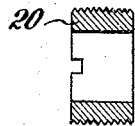
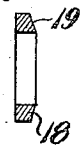
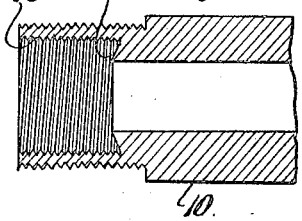
Inventor,
James Rook.

Patented Nov. 25, 1924.                                                      1,516,689

UNITED STATES PATENT OFFICE.

JAMES ROOK, OF LONDON, ENGLAND.

CASE FOR STERILIZING OR CARRYING CLINICAL THERMOMETERS.

Application filed March 9, 1923. Serial No. 623,940.

*To all whom it may concern:*

Be it known that I, JAMES ROOK, a subject of the King of Great Britain and Ireland, residing at London, England, have invented certain new and useful Improvements in Cases for Sterilizing or Carrying Clinical Thermometers, of which the following is a specification.

This invention relates to cases for carrying and/or sterilizing clinical thermometers, and refers to that type of such devices comprising a tubular body portion provided with ends, one or both of which may be removable, the said casing being adapted to be filled to a required height with a disinfecting liquid, and being provided with means for holding the thermometer, when not in use, with the bulb and lower end dipping into the disinfectant.

With devices of this description it has already been proposed, for holding the thermometer in position, to provide a ring or holder U-shaped in cross section and attached in the interior of the casing, into which is inserted a rubber washer adapted to fit closely the periphery of the thermometer when in position.

With devices of this description, as hitherto constructed, it is found that various drawbacks exist. For instance there is a tendency, when inserting the thermometer to pull the washer from its seating, and when the thermometer is removed and the case inverted, there is a tendency to leak.

Moreover, as only one ring or holder has in general been provided there is a tendency for the thermometer to become displaced except when the upper portion of the casing is filled with a stuffing of absorbent cotton or the like, which is found in practice to render difficult the insertion of the thermometer.

My present invention is designed to overcome these drawbacks.

According to my invention, I provide for the purpose of holding the thermometer and preventing the egress of liquid when the thermometer is removed a flexible valve comprising a rubber disc located transversely of the casing and secured in position at its periphery, the central portion of the said disc having an enlarged or thickened boss through a perforation in which the end of the thermometer is forced or passed, the material of the valve being strengthened at the rim, in order to enable it to be gripped in position and prevent it being displaced by the passage of the thermometer.

I also prefer to provide a plurality of supporting devices in order to hold the thermometer securely in position, and to enable one or more chambers for the reception of disinfecting liquid to be furnished.

The interior of the case may also be provided with pads, washers or rings of rubber or other suitable material, for the purpose of absorbing shocks and preventing breakage in the event of the case being dropped or roughly used.

In order that the invention may be readily understood, reference is made to the accompanying drawings which show, by way of example, a case constructed of three parts for carrying a clinical thermometer in which:—

Fig. 1 is a central longitudinal section through the case.

Fig. 2 is an enlarged sectional view showing the position of the valve when the thermometer is in position.

Fig. 3 is a transverse section through the casing showing the valve closed.

Fig. 4 is an enlarged sectional view of the central portion of the casing.

Fig. 5 is a similar view of the washer for securing the valve in position.

Fig. 6 is a sectional view of the screw threaded sleeve or bush for securing the washer and valve in position.

Fig 7. is a view similar to Fig. 3, showing the valve constructed for use with a case for containing three thermometers.

Referring to Figs. 1—6, of the drawings, the casing, which may be formed of vulcanite, metal or other suitable material or materials, is formed in three parts comprising a central portion 10 of substantially cylindrical shape in cross section and two end portions 11, and 12 respectively, each constituting a closing cap for the corresponding end of the central portion 10. Each end of the central body portion is provided with an internally screw threaded recess 13, the bottom of which is inclined to the transverse plane of the case so as to form an annular seating 14, for the valve 15. The valve 15 consists of a disc or the like of rubber or other suitable flexible material provided with a central boss 16, through the centre of which is a perforation, and with a thickened or flanged rim or periphery 17, the boss 16 being shown in the drawings towards the side on which the thermometer is inserted but the bosses may be on the opposite side or on both sides if desired. The valve disc is secured in position against the seating 14 by a ring 18, having an inner annular inclined face 19, and the ring in turn is pressed into the recess 13 to grip the periphery of the valve in position by means of a screw threaded sleeve or bush 20. The valves at each end of the central portion 10 are of similar construction and the central bosses on the valves are in each case located towards that end of the case in which the thermometer is inserted, although, as previously mentioned the bosses may be located otherwise if preferred.

The closing caps 11 and 12 are each formed with internal screw threads, so as to enable the same to be screwed on to the ends of the central portion, the threads employed being quick threads so that the caps may be removed with the minimum turning movement thereof.

The bores extending through the portion 10, the rings 18 and the sleeves 20 are preferably of the same diameter, and somewhat greater than the normal diameter of the thermometer, or the like to be inserted in the case.

The bottom of the bore in each of the closing caps 11 and 12 is preferably provided with a pad or washer 21 of rubber or the like material against which the ends of the thermometer engage when the caps are in position, thus preventing damage to the thermometer, if the case is dropped or roughly handled. Alternatively the interior of the caps may be provided with flexible rings which engage the surface of the thermometer and retain the same against movement in the case.

The sterilizing liquid or composition is placed in the cap 11 and if desired in the interior of the central portion 10, the cap 11 being filled before being screwed on to the central portion 10. The thermometer is then inserted into the opposite end and may be pushed down through each of the valve discs until the bottom thereof rests on the buffering pad in the cap 11, after which the screwed cap 12 is attached to the central portion 10. When inserting the thermometer, the pointed lower end thereof comes into contact with the centre of the valve disc and by applying sufficient pressure the latter is opened out at the perforation and the material stretches to permit the thermometer to pass through at the same time preventing leakage of the liquid from the interior of the central portion 10. The same takes place with the other valve. When the thermometer is withdrawn, the flexible nature of the valve effects a cleaning action on the outer surface of the thermometer by removing the excess moisture therefrom, and permits the same to close and thus prevent the liquid escaping.

It will be understood that the case will usually be carried in the pocket with the cap 12 uppermost, but when the thermometer is removed, the liquid will not escape when the case is reversed for a comparatively short period.

The outer surfaces of the central portion 10 and the caps 11 and 12, are preferably milled, knurled and serrated at 22, to facilitate the attachment of the parts to one another.

Fig. 7 shows a construction of valve adapted for use in a case carrying three thermometers side by side. In this construction the casing 10 would be of course made of suitable dimensions, and the valve, which is secured in position at its periphery, is provided with three bossed portions 23 each having a central perforation for the passage of the thermometer therethrough. The valve in addition to being supported at its periphery is secured between discs 24 only one of which is shown in Fig. 7, of suitable rigid material which permits flexibility of the bossed portions and the portions of the valve surrounding said bossed portions. The container for the sterilizing liquid may be of the full size of the case so that the three thermometers are immersed in the same reservoir or separate reservoirs may be provided consisting of a series of three parallel cylindrical reservoirs.

It will be understood that the details of construction and arrangement of the parts may be modified without departing from the principle of the invention.

What I claim and desire to secure by Letters Patent in the United States of America is:—

A case for carrying thermometers, comprising a body portion with a bore extending from end to end, a perforated disc valve having a central perforated boss, for the passage of a thermometer, and a thickened rim or flange, secured in the bore at each end of the body leaving a space between the two valves, a reservoir for sterilizing liquid, detachably secured to and forming a closed extension at one end of the body, a cap having a closed end detachably secured at the other end of the body, a resilient pad located within the reservoir, against which the end of a thermometer is adapted to come and another resilient pad within the cap to take against the other end of a thermometer, for the purposes set forth.

In witness whereof I affix my signature.

JAMES ROOK.